(12) United States Patent
Kleiner et al.

(10) Patent No.: US 8,494,156 B2
(45) Date of Patent: Jul. 23, 2013

(54) SYSTEM, ARCHITECTURE AND METHOD FOR SECURE ENCRYPTION AND DECRYPTION

(76) Inventors: Robert Frank Kleiner, Calgary (CA); Frederik Sebastian Kleiner, Provo, UT (US)

( * ) Notice: Subject to any disclaimer, the term of this patent is extended or adjusted under 35 U.S.C. 154(b) by 0 days.

(21) Appl. No.: 13/346,944

(22) Filed: Jan. 10, 2012

(65) Prior Publication Data

US 2013/0086391 A1     Apr. 4, 2013

Related U.S. Application Data

(60) Provisional application No. 61/542,364, filed on Oct. 3, 2011.

(51) Int. Cl.
*H04L 9/00*     (2006.01)

(52) U.S. Cl.
USPC ............. 380/44; 380/259; 380/28; 713/193

(58) Field of Classification Search
None
See application file for complete search history.

(56) References Cited

U.S. PATENT DOCUMENTS

2010/0246811 A1*  9/2010  Sadler ........................... 380/28

* cited by examiner

*Primary Examiner* — Minh Dinh (57) ABSTRACT

There is disclosed a system, architecture and method for encryption and decryption of a record. In an embodiment, a method comprises identifying a target record to be encrypted; analyzing one or more clear text linguistic attributes of the target record; generating a linguistic encryption key based on the analysis of one or more clear text linguistic attributes; and encrypting the target record with the linguistic encryption key, the linguistic encryption key operable to decrypt the encrypted target record in a reverse operation.

17 Claims, 4 Drawing Sheets

SYSTEM, ARCHITECTURE AND METHOD FOR SECURE ENCRYPTION AND DECRYPTION

CROSS-REFERENCE TO RELATED APPLICATIONS

This application claims priority from U.S. Provisional Application No. 61/542,364, entitled SYSTEM, ARCHITECTURE AND METHOD FOR SECURE ENCRYPTION AND DECRYPTION, and filed on Oct. 3, 2011, which is incorporated herein by reference in its entirety.

FIELD OF THE INVENTION

The present disclosure relates to a system, architecture and method for secure encryption and decryption.

BACKGROUND

Today, more than ever, companies face a daunting challenge of establishing secure IT environments to prevent hacking and break-ins. Computing power continues to advance at a rapid rate, and encryption algorithms once thought to be secure are becoming less secure, as hacking tools become more powerful. Recent major security breaches of not just regular companies but also companies in the business of electronic data security themselves have been victims of sophisticated hacking efforts. These incidents have demonstrated the need to continue to develop stronger encryption tools and architectures in order to secure sensitive data from breach. As a result, what is needed is an improved system, architecture and method for encryption and decryption that will make it even more difficult for hackers to gain unauthorized access to sensitive, encrypted data.

SUMMARY

As noted above, the present invention relates to a system, architecture and method for secure encryption and decryption. More particularly, the present system, architecture and method provides an encryption method which generates a user specific encryption key based on analyzing the linguistic attributes or characteristics of clear text in a record to be encrypted.

In an embodiment, the system and method analyzes the linguistic characteristics or attributes of every clear text record and generates a unique Linguistic Encryption Key for every encryption process.

In another embodiment, multiple levels of encryption processes are used in combination, with at least one of the levels encrypted using a unique Linguistic Encryption Key based on an analysis of the record to be encrypted.

The present invention prevents any common and conceivable option to decipher the cipher text because multiple encryption levels and keys generated from random code for every record for every user makes it virtually impossible for deciphering algorithms to find any "common" similarities between different cipher texts.

DETAILED DESCRIPTION

As noted above, the present disclosure relates to a system, architecture and method for secure encryption and decryption. More particularly, the present system, architecture and method provides an encryption method which generates a user specific encryption key based on analyzing the linguistic attributes or characteristics of clear text in a file to be encrypted.

The user specific and file dependent Linguistic Encryption Key is different for each file based on the particular linguistic attributes or characteristics of each record or file, such that the resulting cipher text cannot be analyzed for any patterns as between two records or files encrypted with different Linguistic Encryption Keys. As will be explained in more detail below, even the deletion of a single space from a text in a record results in a completely new cipher text that cannot be compared to the cipher text for the original text having the extra space. Only the specific Linguistic Encryption Key used for encryption of the record may be used to decrypt the record. In an embodiment, the user specific multiple Linguistic Encryption Keys are managed by a central security server which provides secured access based on a device and user authentication procedure, such that only an actual authenticated user may access the Linguistic Encryption Keys.

An illustrative embodiment of the present invention will now be described in detail with reference to FIGS. 1 to 4 as enclosed.

Figure 1:
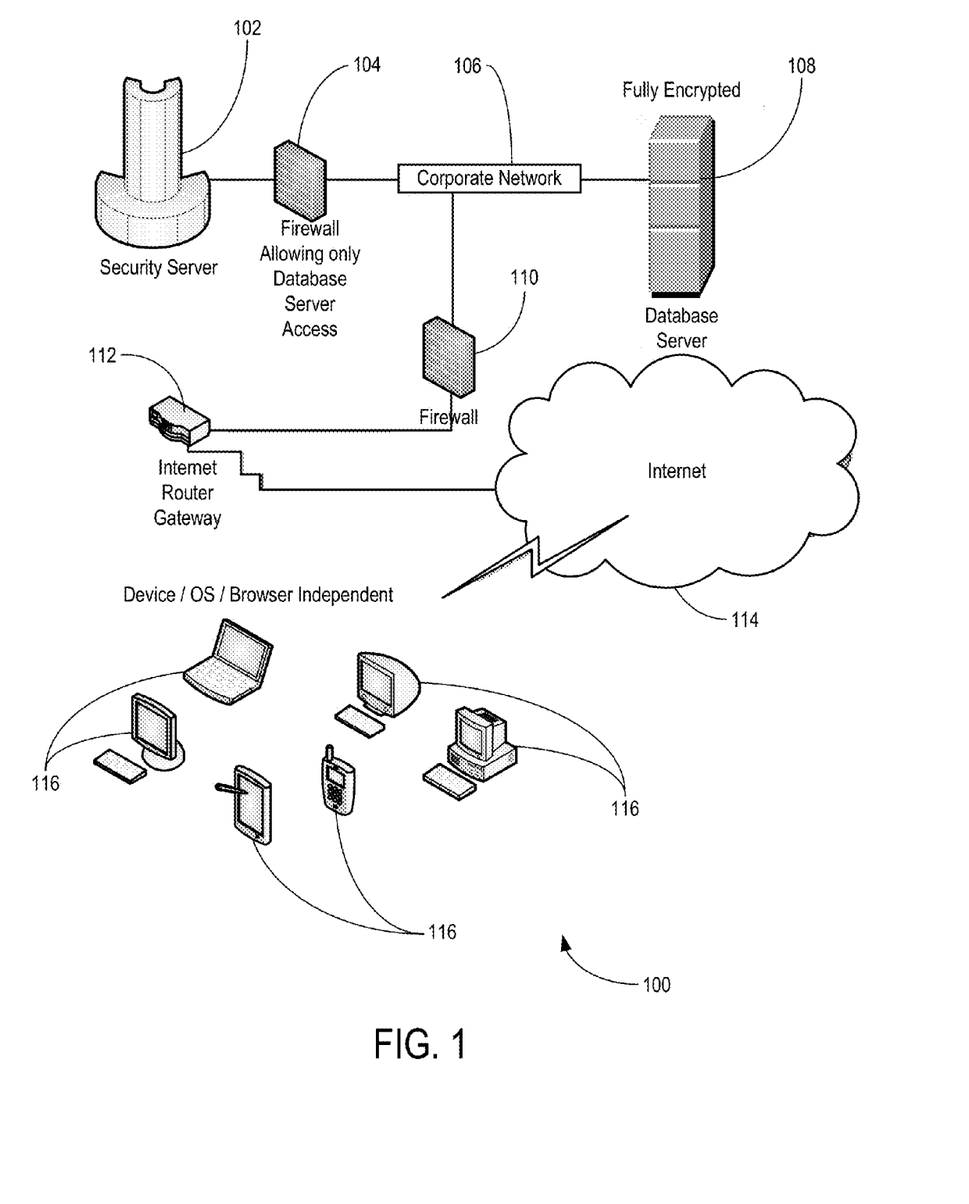
FIG. 1 shows a schematic representation of an illustrative architecture in accordance with an embodiment.

Referring to FIG. 1, shown is a schematic representation of an illustrative system and architecture 100 in accordance with an embodiment. As shown, system 100 includes a security server 102 operatively connected through a firewall 104 to a corporate network 106. Corporate network 106 in turn is operatively connected to a fully encrypted database server 108.

Security server 102 is configured to securely store various user accounts, and encryption keys associated with each user account. Security server 102 does not store clear text, and access is only granted after an authenticated device/user verification process is successful. Firewall 104 is configured to allow access only to a fully encryption database server 108. By having security server 102 disconnected from the Internet and only being authorized to be accessed by the encryption database server 108, hackers cannot gain access to the key reference tables.

Corporate network 106 is operative connected through a firewall 110 to an Internet router gateway 112 connected to the Internet 114. The Internet 114 allows a plurality of devices 116 to access the database server 108 if the device 116 and user are properly authenticated, as described in further detail below. As shown, the devices 116 may include a desktop computer, a laptop computer, a smart phone, a tablet, and the like, which may connect wirelessly or via an Ethernet connection.

Figure 2:
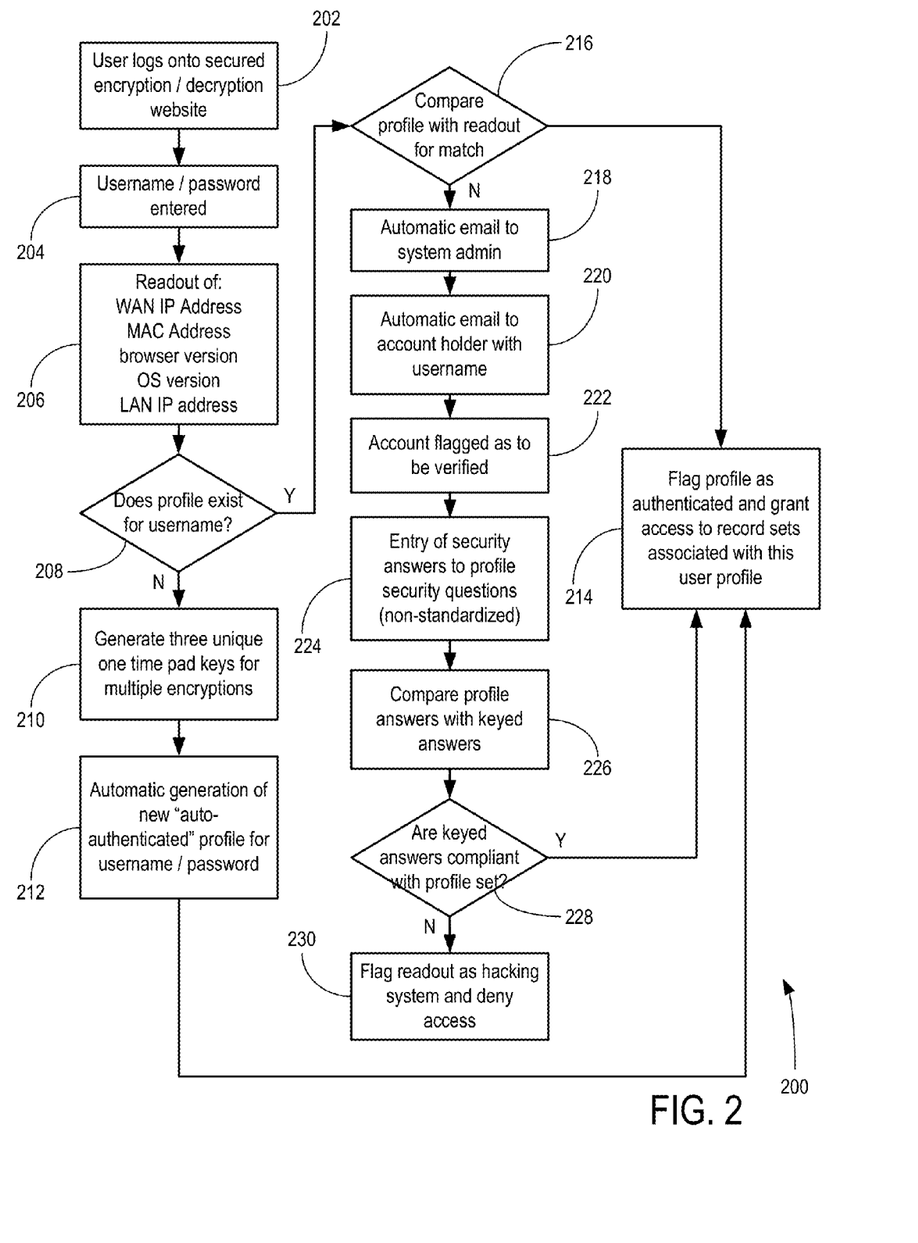
FIG. 2 shows a schematic flow diagram of an illustrative authentication step using profiles in accordance with an embodiment.

Now referring to FIG. 2, shown is a schematic flow diagram of an illustrative authentication method 200 using profiles in accordance with an embodiment.

As shown, the authentication process begins at block 202, where process 202 initiates a logon screen to provide access to an encryption/decryption website via database server 108. Method 200 proceeds to block 204 where the username/password are entered.

In an embodiment, method 200 then proceeds to block 206, where method 200 performs a device identification step which may include, for example, reading a WAN IP address, a MAC address, a browser version, an OS version, and/or a LAN IP address for a device 116 attempting to access the system. The resulting device profile should match the profile of a device already authenticated within a user's profile. By requiring a device authentication step to confirm that the device is one normally used by a registered user to access the system, a first level of security may be provided based on the accessing device. Upon successful login, a unique "user-specified key" is distributed to the device and cross referenced on security server 102.

Alternatively, the system may allow a user to access data from any device available, including devices which have not been preauthorized. This may be the case, for example, where a system is accessed by a user through a given device for the first time, as the device is new and has not yet been authenticated. In this case, the user may be required to answer additional questions or to complete additional verification steps before being authorized to access the system. As soon as the correct answers have been given, the device is authenticated for the future via a stored record or reference uniquely identifying the authenticated device.

At decision block 208, method 200 determines whether the entered profile for a username exists. If no, method 200 proceeds to block 210, where method 200 generates three unique one time pad keys for multiple encryptions. Method 200 then proceeds to block 212, where method 200 automatically generates a new "auto-authenticated" profile for the username/password. Method 200 then proceeds to block 214, where method 200 flags the profile as authenticated, and grants access to record sets associated with the user profile.

At decision block 208, if the answer is yes, method 200 proceeds to decision block 216, where method 200 compares the profile with the device readout for a match. If there is a match, method 200 proceeds to block 214, where method 200 flags the profile as authenticated, and grants access to record sets associated with the user profile.

At block 216, if there is no match, method 200 proceeds to block 218, where method 200 automatically emails a warning to the system administrator. At block 220, method 200 also automatically sends an email to the account holder of the username to alert the account holder of a lack of a match. Method 200 then proceeds to block 222 where method 200 flags the accounts as to be verified.

Method 200 then proceeds to block 224, where method 200 reviews the entry of security answers to a set of non-standardized profile security questions. At block 226, method 200 compares the profile answers with the keyed answers. Method 200 then proceeds to decision block 228, where method 200 determines whether the keyed answers are compliant with the profile set. If yes, method 200 proceeds to block 214, flags the profile as authenticated, and grants access to the record sets associated with the user profile.

At decision block 228, if the answer is no, method 200 proceeds to block 230, where method 200 flags the readout as a suspected hacking attempt and denies access.

Figure 3:
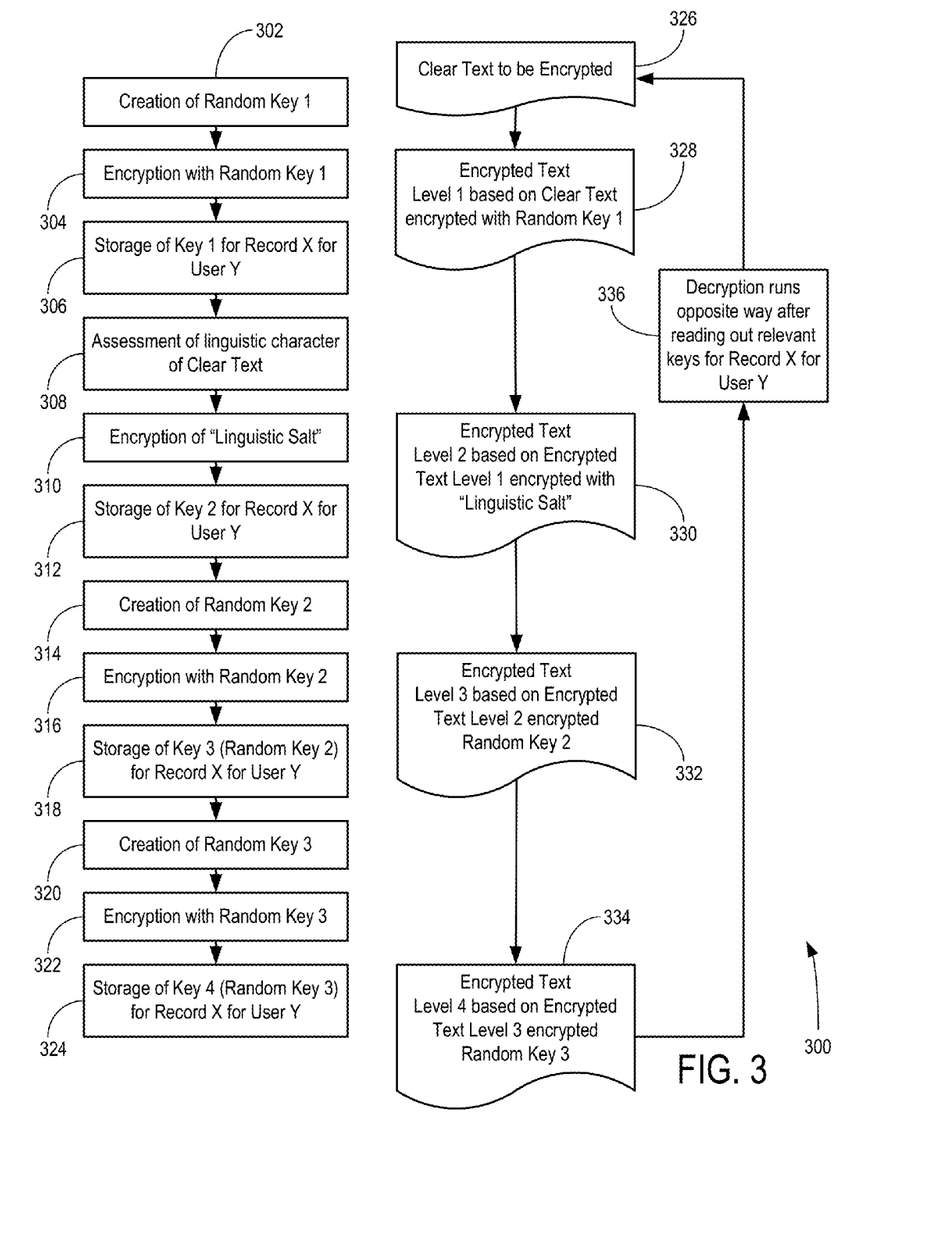
FIG. 3 shows a schematic flow diagram illustrating a method of encryption in accordance with an embodiment.

Now referring to FIG. 3, shown is a schematic flow diagram illustrating a method of encryption in accordance with an embodiment. As shown, method 300 begins at block 302, where method 300 begins with the creation of a Random Key 1. Method 300 then proceeds to block 304, where method 300 encrypts a target Record X with Random Key 1. Method 300 then proceeds to block 206, where Random Key 1 is stored for Record X for a User Y.

Next, method 300 proceeds to block 308, where method 300 performs an analysis of the linguistic attributes or character of the original clear text within Record X. For example, in an embodiment, one or more of the following linguistic attributes or characteristics may be checked within the clear text:
1. Length
2. Number of spaces
3. Number of commas
4. Number of Hyphens
5. Number of Exclamation Marks
6. Number of Words It will be appreciated that the above linguistic attributes are illustrative, and other types of linguistic attributes of the clear text may be used instead, such as the number of certain characters or punctuations, for example. Any linguistic attributes or characteristics that would provide a sufficiently high degree of randomness and uniqueness for a given piece of clear text may be used to perform an analysis.

Based on this analysis of the linguistic attributes or character of clear text in Record X, method 300 creates a Linguistic Encryption Key. For example, the linguistic attributes may be used to generate a "salt" (i.e. a string of random bits) to create a one-way function which will further encrypt the clear text.

As an illustrative example, a possible Linguistic Encryption Key may look like this:
 a. 130/10?2!0@4&43
 b. 130=String length
 c. /=Separator
 d. 10=number of spaces
 e. ?=Separator
 f. 2=number of commas
 g. !=Separator
 h. 0=Number of hyphens
 i. @=Separator
 j. 4=Number of Exclamation Marks
 k. &=Separator
 l. 43=Number of words The Linguistic Encryption Key as illustrated above is based on a linguistic analysis of each record.

Advantageously, the Linguistic Encryption Key adds a twist to an encryption process in a way that is unpredictable, thus making the encryption much more difficult to break.

Next, method 300 proceeds to block 310, where the salt generated from analysis of the linguistic attributes of a record is used to create a Linguistic Encryption Key, which is then used to encrypt Record X.

Method 300 then proceeds to block 312, where method 300 stores the Linguistic Encryption Key for Record X, for User Y.

Method 300 then proceeds to block 314, where method 300 creates a Random Key 2, and at block 316 further encrypts the encrypted Record X with Random Key 2.

Method 300 then proceeds to block 318, where method 300 stores Key 3 (Random Key 2) for Record X, for User Y.

Method 300 then proceeds to block 320, where method 300 creates a Random Key 3, and at block 322 further encrypts Record X with Random Key 3. At block 324, method 300 stores Key 4 (Random Key 3) for Record X, for User Y. Thus, for every Record X, the unique set of keys are stored and referenced for every User Y.

Still referring to FIG. 3, shown in parallel with method 300 is a schematic representation of Record X, which at 326 is shown to be clear text to be encrypted.

Next, Record X is shown at 328 adjacent block 304 as encrypted text at Level 1 based on clear text encrypted with a Random Key 1.

Next, Record X is shown at 330 adjacent block 310, where Record X is now encrypted at Level 2 using a Linguistic Encryption Key.

Record X is shown again at 332 adjacent block 316, where Record X is now encrypted at Level 3 using Random Key 2.

Finally, Record X is shown again at 334 adjacent block 324, where Record X is now encrypted at Level 4 using Random Key 3.

Thus, to make the encryption stronger and more complicated for potential hackers, multiple levels of locks may be employed, including at least one level involving analysis of linguistic attributes of the record being encrypted to make it virtually impossible for hackers to break the encryption (e.g. by locating the common letters "e" and "a", and trying to extrapolate the rest of the alphabet).

As shown at 336, decryption of Record X is accomplished by unlocking each level of encryption using the corresponding key in a reverse operation. More particularly, the linguistic encryption key is operable to decrypt the encrypted target record in a reverse operation.

While this illustrative example has shown the Linguistic Encryption Key being used as a second level of encryption in a multi-level encryption process, it will be appreciated that the Linguistic Encryption Key may be used at another level of encryption, such as the first or third. As well, the number of levels of encryption may be varied to be higher or lower than four levels, although the inventors have determined that four levels of encryption including at least one level of encryption using a Linguistic Encryption Key provides a high degree of apparent randomness and security such that the encrypted record is very difficult to break without the keys.

Example 1

An illustrative example of linguistic encryption may be shown using the following sample clear text from a news article, which is converted to cipher text using a Linguistic Encryption Key.

"(CLEAR TEXT) Cairo (CNN)—Egyptian police trying to clamp down on demonstrations against President Hosni Mubarak early this year were told to use tear gas, but not automatic weapons or live ammunition, a senior Egyptian police official testified Monday at Mubarak's trial.

General Hussein Saeed Mohamed Mursi was one of several senior police officials due to testify Monday.

During his testimony, prosecutors attempted to cast doubt on Mursi's credibility, as he was in charge of communication between police forces on the ground.

According to testimony, police were ordered to use police vehicles to disperse protesters, Egyptian state television reported.

Using the user and profile specific encryption key, and in conjunction with the linguistic encryption algorithm, the following cipher text results:

j69FfVADzQ6r5WPCq8M7gcHCQUx8 2JPS3PffythAZzMZCvOHgL4mVSf6 XQXBJIwS7mX3FNdi4G7oIzqBgJKt Q6FJ0RoKHWMqf2oPR9ICtIXfo+Ly wT78S0jgI5nuHUv+MMEIOrE13HQ wxALuKscDg/ kDtvyhhnFwecs6zEEe 46VQJ6drNebBKwGEC3vQXXINdIVz fafxoOKD2gAxXPECxDU45b2f+qJzA dx9P3viiknJ1+SJdr73MkgCMzS33Q DXipiW7x/ 34hMEcbfLB2+svUkm+tM eiQANykl8YFUEnIgfuANUvnxOGfkl kBT4xaeyh1YZqiVv+NEiApKX2mmb LFsXQ8hkYtZLkeVbCuoXJJSrToQ1V WQZhgx8CgRsN1fURgkDIUwkhN/h OSZb5iLmgUAE2juRofV2KDD3f/8A5 DrTq0SsBsCJ P9TRKO4o6KhfATCyG jiqv+ PBTtOciZis52gprnHeVWUL1R Cm6QxtJv36c6sao7cQwwDxFDFXtL n0sOy21MJ1bZJKGKEIb1i0BN1zgnW Ch6ZWXYk6A0XPwCV5T4NWdBYqC fS7nakuJ5tGMF3RR7j2bQAy3HUoF qvYuhEwwx2r/ 8PwUhYJerYZ2c2tyy U9vFfw4uM8Mv9DNdlbEBRb620rB+091O1/ BofbqtiCDY3e8cLrOsfMCPLB PFGb/ BDgSRtLjIO7tYtCXI6yjXWqd dFPv5PjdsZybDFjRn4nIdFI+pA9W2 BB1bcM0yzCUAzItRKeRD4npZ0wTF le2G3xyrFQOhknUnV8/zBkQypftBC Gxex2Vpe3e1YpD16Hs5odRzgesdBq MoyofNV1j0xUEMmsbidwR3ws7Wea cuqs4mUd zRE+xfC3tph586sQM4Y hqin6VpHD/r9t7Tq1pu2+ OEndDiFlv rg75r2s1zhoVwDE3qTVgWn96VnbP LsLM9UdqOteI3fNq2qemsc+rylJgLq mnqiac3Z/ VQJuwybAyn21ia5eo/418I w40uNFzcsubk8M2oRpcTQJHw/cT3y HEfBc69D5JfCQI+LrNhG1nrm4xvR TyLilm6JegmXZBfmTaCDiCEzk0U0 7W9L8Qr+ Kcn+xMGD3WjCNQBe1GP Y7GH/ m4jKhwGG6fNzkZ70nndWe+3 Ky2o/ 601aSaYoX8icNhpRSmAIDNsp VgutL/ zKpUBLFhVoUbvXhZyu9b8C 7+jMifktjoHSyo0PP65omb+5gohMUs Mt354a3T9UQ+t04j8T9lJkgnEcHWo rV0IX54bQis4YZhEsMy2p+E5YY74D v35/ ab7vrvQpfTyCjrvLy5SA+7vbJQ UjJ6Zg5s96Bl2dq/ 3PqPbfM04uAi8Xi D+51dfF+hcjYgsnoMgG06cmZC/ o0qJ fkK86f/TEcoipmf7pqxoMPMSXIOIq9 szyxEar0vwHHDDu8RFS5k8iRs4njH B8zqGthG2hfUY/GoNwGes22McV1P xMkRmnGsITolQ0D/U1d8xqneaN+U gUkDcKIh7kpdb5DzZD639mtwd1ah MjQWHT/ tyD6p4bCGDFxL18aKUIE UjWekRA4+/YTwHS/ 07zHFa 2fLjMfN NS5ruWkY4myupXF2JX9Ebwf5WDx xPQr65PuIMLF4b0xi51fy8A5HTKUi K6q4+gN/ d3VeAM9udYlpOEqyESgj mXSwnGkuPsnccdpYA9uiesYgK4L7y 8vde1qEIBB5+RBpBoZrR4XZMDWIk 9QiUJwqr12+ nBRDVd0z/8pkrp5GHA KYThLL0aISa4x8sregxXTQkxUXv5i fRBav8JbVZD8G78BnRUWIamF/UZq fE8kY5JJ4IGYUyEmpPpvVBxTXBqq 2ERlzi9rqViCwf5r0+QxOkTB4xhgqY oV8KFzV9JYERGpuXBiDEeRlo5XFK sSF11IhiPx6tbhnV8Lun5Y2EErP/9S tZivJAV10IqkhyyTppkLp7sa2IdFey 4APXcLCFPg5H+6LiKQcYmX8JRBE hUOUxmG8BtMQ8HP7EPlr1cQT8Ln uRYN1M819OlH6sDMrGYelyrrCkc W4yZROtk1714gqYGK9nxb+

Comparing this to a slightly modified clear text, taking out just one space before the word "Egyptian" will result in cipher text that contains significant encryption changes that make the cipher text completely unrecognizable when compared to the original cipher text as illustrated by this example.

kZsmWtNT+IhnSXZnN25d8oyff/Fa65BvPPwdzq
MOu0Nd2FtwRTUGyPHRdVnb/zQN2CZDz/8gNF
YzQQTCVNEcejghCMSSnDbme3Z13BoJYr84u8G
TcZX/DoVIObmvYKye61WopbRI6tcaAwRvmU+A
mjjPwGhP3R+PjyZF8fOfX3vExZTPTS3XUHeB3
Gf9/VydpcyDYd1wbIhsT1hjIbLg1XVNPeZyKvH+
p8Grbo3tfWVqyAiy6SAEZ8kayEPxMGuRnctNDa
uRcbTdHK/m8SQF3C1eV5PJD/xPdorTwL17dzd6
PY8G9PUZOD19uKF2KQvb8bwe3Bi1/IGmhBGj/M
VNpANH8s5uDviTafkzVcYy+BgtwBCV4e4rLq/68
gE1x5pUiQ4HjYhPwot7mObcs8p+qzYwxf6extqN
ga2re76zrI6SZHj2p/v8mhTW/LMBHnXOEuZtLw
pV7ddxWyRJ+rtsKqzlR7PxwrkkHfTbMrvQsrJwE
QHyDr/G762K2sxR+kX1RGaj8D8lOqYGbvTWNK
QkQVPR5EXsBX1pWis1ukHyCIcjCMEq4Ujqs3x
QGeZxanE+K7GcDNsR0mCjBfBr/rmVqP/w+WBb
BL7g5sMv39LddYw7ZC3RUneQZeKI3BfqsHMd
MusHycf9k6xTkc89HH58wsd2UouK3CrKcWMyn
KJfde0/77jJkWq1l9wp9fGwGUjm/5WiGMm1sIW
uNeFQytqwE3/K4p3m2NHVWbNLZE3MkjIKFm
yK497J0RmrWWC9OFa9jr91dMpXXd8U4L7Zn9d
ta2aJjWwA0XjiQSqjYvUxBtQhrcC24LMxn60MZ2
YSwnYCJUDmvNebXe6YOSnn1l9y/9ddfSz+U7uo
SpRR1/qECtbiDgY7ZLiacLX7ayrf9l54fWoOTp9ok
iR7IOBFUX2sg6Zr6SDfcjBSlbxtwo2UEZyca56WJ
XBZXxlwocepc3kjd8DCnendfuMnlpPW0OYPBPG
gaZzuAZY/aMuW6yVZcoQPI7sNK8BC6fxhd8b2C
rnKxd9MUiNn7qQhsLZFTDQdEZ6t1tIEua7aApE
XANsygpPhHlDSgqLHb4umqOJZOiSzs9NpH6dK
8f1m4UNyg/HEtYcETA6FFILGAwvSmE2L/LrTA
XE1b4fuE8L3yRa16xr4x56uyejhRE3HAod7K0lqA
gCIuUL3bnI+1nqkuT5b3W/1uy9RE6A9iYPzmXes
lt3T6Rb/Dclk2ganMFptiQ4iWhKsdmlN+yQAZuZ
7urrK8yrhBou1N/u10BELh89vspDoEOZI3sMw+Y
T5mpx5pmLwvkpRGVcsBx1uPnpFBZ/CiIvY6ojox
36o/gR/WkhutMPoVp7sNZ1aOzISGTcQB5pLWBg
lKnHNc1IdTTU/4GkXF16pweOUbFWwtyNIwpX
NnahjD07rVXf/u0XjHwE+ZQWojANaUylulYTyGc
Y/iHwvSFNKeRSsRy8Yzm3DNco3U/xsMj+Erijsq/9
P+ATjHvBDl9WAktmUaODA2/40xWYVa50F+Q
BHK91JV6+UHL+JmYVC3JahpEbdno0t2F7pIj9
UW/6nKvtGnV1CAj8rxwdyr3YnPaHMYLzQO3gI
gh+vqE3Vf7XjmZO+GFsPH9/NDHx1qeTBPJQjIl
5Oqmy6qjlL0NXdf53J7JpHn2ffyOu7SjikU3/YcY2
1Fbr9PJqprab9PZM6qf5DpL0to/PHiY0IncEWCoh
vpN+99ZdlgSSwGL2VNdF9DzS0x9QrKvyT4mXK
oLJED6DDBxVjJ2u3vUthujmzPsS5Wd1Zn/XoX7
J1J5NggDxmsQFspFopGASjafEKZYlozoJV8NhK
XOgyroKzYs+aN46YJc/2DSwJhL97lZMEsHjsflB2
DFF1vGTzrwtEzTHxpUIOvZC2VqDwa2YL1g/r7z
41MszYwbE4mYgnGDyqCbHc09UFRvfuOHF7A/
AjP179 ODoiqsJb87a/yDSHmM55KL32ywG Due to the generation of an entirely different cipher text based on just a minor difference in the clear text, it will be recognized that the present system, architecture and method provides a powerful way to encrypt clear text making it very difficult, if not impossible, to try to analyze encrypted text based on identifying similarities or patterns in different samples of cipher text. For example, a hacking method of trying to find patterns in the cipher text identifying common vowels such as "a" and "e" is of no use, as the cipher text will vary unrecognizably from one record to the next based on, for example, the removal of a single space from a passage of text.

Example 2

As illustrated by another example using a Chinese phrase, it will be seen that the cipher text resulting from encryption provides just as much apparent randomness in the cipher text as a passage of text in English, once again making it difficult if not impossible to try to analyze the code based on pattern analysis.

For example, the following Chinese language text

故用兵之法，十则围之，五则攻之，倍则分之，敌则能
战之，少则能守之，不若则能避之 becomes:

sNILDII8mTQbjBBzpTo264Ahosdp/IMwqb
cKDj5FJXxAaEmFxYZzaCyOlsJgQJff7Dky
eW1MmCGqj0f5VXPpyElTh387ESUsgBZ
QpmMUcdip62t9RnRYIilHTLxEBSv4oGV
yKoKuEVjK3NrfSMJ0OWu8qL0cA5V/
nNYwNYeaMluz9YPjjoaJAhR9kEvE+UG+
seD5Llec0n0u/b2i7h0+e9zcAHROeSm
VQjBWe37KeA82nMo6XIEonXL25BEBm Chs13+
gJN+7QFge3oxwtQMzkYYx1SFzeY
NJNAm89CPCdnwuWMmvdiruG/mss7Iwlf
1gm7JRSEPCEg6iIAvg==

In an embodiment, while another character set could have been chosen, the default encryption character set is Latin (i.e. A-Z, 1-9, !@# . . . ) such that the cipher text appears to be a random sequence of Latin characters. Decryption occurs in whichever language the clear text might be in.

In an embodiment, every character is selected for encryption is represented internally in the system as a hexadecimal number. Non-Latin character sets such as Chinese and Russian may use the standard international UTF-8 code system which covers virtually all character sets in existence, and also allows any characters in the character sets to be based on those internal hex codes.

Example 3

As yet another example, the present system, method and architecture may be used to convert the following Russian text Без труда не вытащишь и рыбку изпруда.

into:

brVjQn8v8fr9xXIDYaLVRoLi5i
xnS2FnQhHSqrwuXgIk3dVOv40MC+
VsjhdIaxvTbRMhzWuqhQ1Qs4s+PB4
q4lznjatjAloQNSuK6XzLOiuHEa8CS
XDs1R0UUQ7E7PzAuwBhVSRGyBYb
B3c2nIhH6hIaMi+3wTQR0s6×4 Khz
TEkFZv7n67qZW715BHg8axJ1eQ1K
aL7LAfp9X1mEak1iABsmXGibIBUB
xrRh0Wy1Kb7WMYgbiIw5K1rWizKu VL39

Once again, the apparent randomness in the cipher text results from applying a Linguistic Encryption Key based on an analysis of the clear text.

Figure 4:
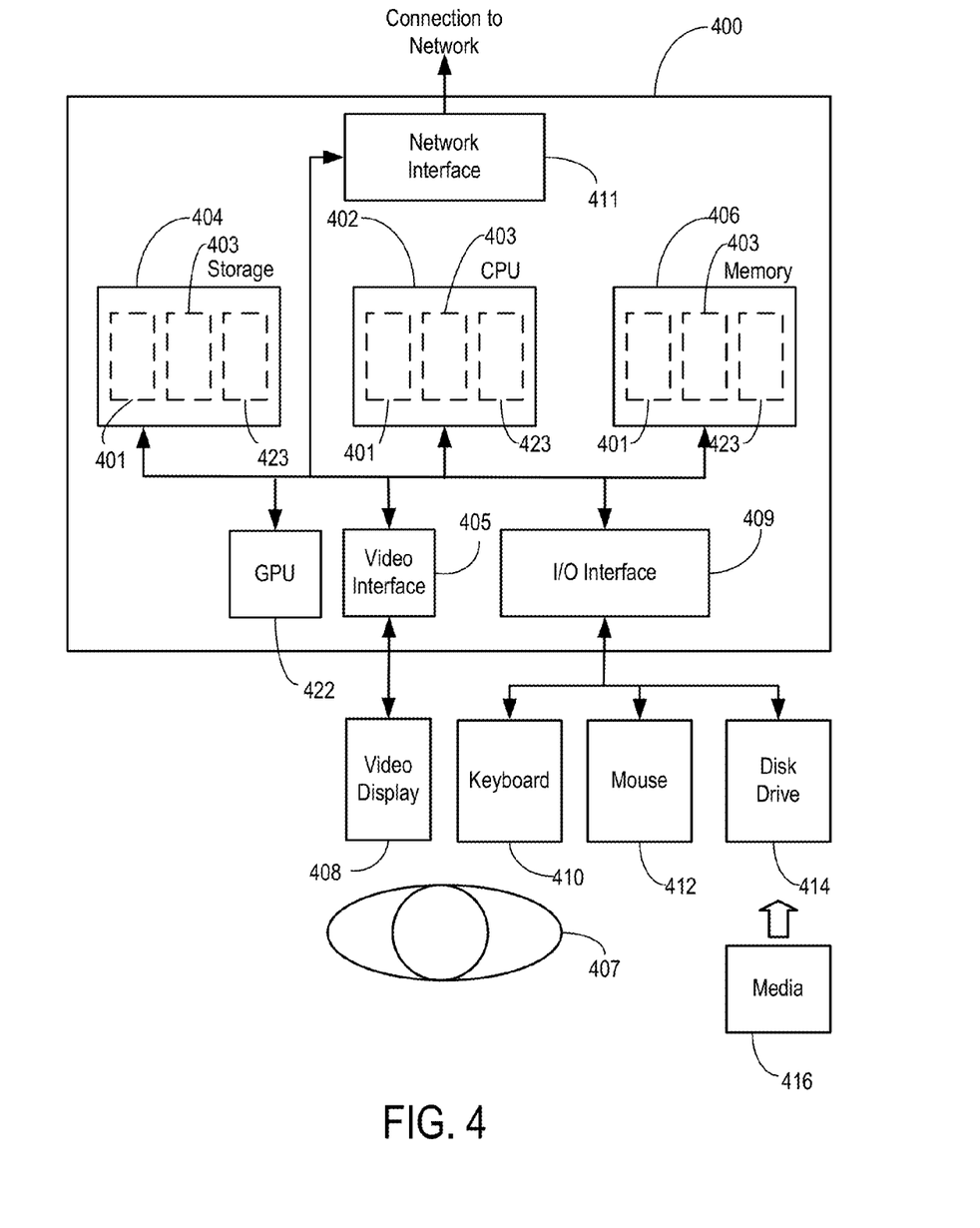
FIG. 4 show a schematic block diagram of a generic computing device that may provide a suitable operating environment for one or more embodiments.

The present system and method may be practiced in various embodiments. A suitably configured computer device, and associated communications networks, devices, software and firmware may provide a platform for enabling one or more embodiments as described above. By way of example, FIG. 4 shows a generic computer device 400 that may include a central processing unit ("CPU") 402 connected to a storage unit 404 and to a random access memory 406. The CPU 402 may process an operating system 401, application program 403, and data 423. The operating system 401, application program 103, and data 423 may be stored in storage unit 404 and loaded into memory 406, as may be required. Computer device 400 may further include a graphics processing unit (GPU) 422 which is operatively connected to CPU 402 and to memory 406 to offload intensive image processing calculations from CPU 402 and run these calculations in parallel with CPU 402. An operator 407 may interact with the computer device 400 using a video display 408 connected by a video interface 405, and various input/output devices such as a keyboard 410, mouse 412, and disk drive or solid state drive 414 connected by an I/O interface 409. In known manner, the mouse 412 may be configured to control movement of a cursor in the video display 408, and to operate various graphical user interface (GUI) controls appearing in the video display 408 with a mouse button. The disk drive or solid state drive 414 may be configured to accept computer readable media 416. The computer device 400 may form part of a network via a network interface 411, allowing the computer device 400 to communicate with other suitably configured data processing systems (not shown).

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

Thus, in an aspect, there is provided a computer-implemented method for a computer-implemented method for encryption and decryption of a record, comprising: identifying a target record to be encrypted; analyzing one or more clear text linguistic attributes of the target record; generating a linguistic encryption key based on the analysis of one or more clear text linguistic attributes; and encrypting the target record with the linguistic encryption key, the linguistic encryption key operable to decrypt the encrypted target record in a reverse operation.

In an embodiment, analyzing one or more clear text linguistic attributes of the target record comprises analyzing the number, location, length, or sequence of one or more characters, words, spaces, and punctuation marks.

In another embodiment, the linguistic encryption key is created based on the analysis of one or more clear text linguistic attributes including the number, location, length, or sequence of one or more characters, words, spaces, and punctuation marks.

In another embodiment, the method comprises encrypting the target record with the linguistic encryption key at one level of multiple levels of encryption steps, whereby the linguistic encryption key must be used at the appropriate level in order to decrypt the encrypted target record in a reverse operation.

In another embodiment, the method further comprises encrypting the target record with the linguistic encryption key as one level of at least four levels of encryption steps.

In another embodiment, the linguistic encryption key comprises a sequence of values for one or more linguistic attributes selected for analysis, and one or more separators to separate the values.

In another embodiment, the clear text is represented by one or more character sets in a standard international text coding system, and the linguistic encryption key is generated from one or more languages capable of being represented by the one or more character sets in the standard international text coding system.

In another aspect, there is provided a computer-implemented system for encryption and decryption of a record, comprising: means for identifying a target record to be encrypted; means for analyzing one or more clear text linguistic attributes of the target record; means for generating a linguistic encryption key based on the analysis of one or more clear text linguistic attributes; and means for encrypting the target record with the linguistic encryption key, the linguistic encryption key operable to decrypt the encrypted target record in a reverse operation.

In an embodiment, the system further comprises means for analyzing the number, location, length, or sequence of one or more characters, words, spaces, and punctuation marks.

In another embodiment, the system further comprises means for creating the linguistic encryption key based on the analysis of one or more clear text linguistic attributes including the number, location, length, or sequence of one or more characters, words, spaces, and punctuation marks.

In another embodiment, the system further comprises means for encrypting the target record with the linguistic encryption key as one level of multiple levels of encryption, whereby the linguistic encryption key must be used at the appropriate level in order to decrypt the encrypted target record in a reverse operation.

In another embodiment, the system further comprises means for encrypting the target record with the linguistic encryption key as one level of at least four levels of encryption.

In another embodiment, the linguistic encryption key comprises a sequence of values for one or more linguistic attributes selected for analysis, and one or more separators to separate the values.

In another embodiment, the clear text is represented by one or more character sets in a standard international text coding system, and the linguistic encryption key is generated from one or more languages capable of being represented by the one or more character sets in the standard international text coding system.

In another aspect, there is provided a non-volatile computer-readable medium storing computer code that when executed on a computing device adapts the device to perform encryption and decryption of a record, the computer-readable medium comprising: code for identifying a target record to be encrypted; code for analyzing one or more clear text linguistic attributes of the target record; code for generating a linguistic encryption key based on the analysis of one or more clear text linguistic attributes; and code for encrypting the target record with the linguistic encryption key, the linguistic encryption key operable to decrypt the encrypted target record in a reverse operation.

In an embodiment, the non-volatile computer-readable medium further comprises code for analyzing the number, location, length, or sequence of one or more characters, words, spaces, and punctuation marks.

In an embodiment, the non-volatile computer-readable medium further comprises code for creating the linguistic encryption key based on the analysis of one or more clear text linguistic attributes including the number, location, length, or sequence of one or more characters, words, spaces, and punctuation marks.

In an embodiment, the non-volatile computer-readable medium further comprises code for encrypting the target record with the linguistic encryption key as one level of a multiple level of encryption, whereby the linguistic encryption key must be used at the appropriate level in order to decrypt the encrypted target record in a reverse operation.

In an embodiment, the non-volatile computer-readable medium further comprises code for encrypting the target record with the linguistic encryption key as one level of at least four levels of encryption.

In another embodiment, the linguistic encryption key comprises a sequence of values for one or more linguistic attributes selected for analysis, and one or more separators to separate the values.

It should be understood that further enhancements to the disclosed system, method and computer program are envisioned, and without limiting the generality of the foregoing, the following specific enhancements are envisioned.

The invention claimed is:

1. A computer-implemented method for encryption and decryption of a record, wherein the method is operable on a computing device having a processor and memory, and comprises:
   identifying, by the processor, a target record to be encrypted;
   analyzing, by the processor, one or more clear text linguistic attributes of the target record;
   generating, by the processor, a linguistic encryption key based on the analysis of one or more clear text linguistic attributes; and
   encrypting, by the processor, the target record with the linguistic encryption key at one level of multiple levels of encryption steps, the linguistic encryption key operable at the appropriate level to decrypt the encrypted target record in a reverse operation.

2. The computer-implemented method of claim 1, wherein analyzing one or more clear text linguistic attributes of the target record comprises analyzing the number, location, length, or sequence of one or more characters, words, spaces, and punctuation marks.

3. The computer-implemented method of claim 1, wherein the linguistic encryption key is created based on the analysis of one or more clear text linguistic attributes including the number, location, length, or sequence of one or more characters, words, spaces, and punctuation marks.

4. The computer-implemented method of claim 1, further comprising encrypting the target record with the linguistic encryption key as one level of at least four levels of encryption steps.

5. The computer-implemented method of claim 1, wherein the linguistic encryption key comprises a sequence of values for one or more linguistic attributes selected for analysis, and one or more separators to separate the values.

6. The computer-implemented method of claim 1, wherein the clear text is represented by one or more character sets in a standard international text coding system, and the linguistic encryption key is generated from one or more languages capable of being represented by the one or more character sets in the standard international text coding system.

7. A computer-implemented system for encryption and decryption of a record, comprising:
   means for identifying a target record to be encrypted;
   means for analyzing one or more clear text linguistic attributes of the target record;
   means for generating a linguistic encryption key based on the analysis of one or more clear text linguistic attributes; and
   means for encrypting the target record with the linguistic encryption key at one level of multiple levels of encryption keys, the linguistic encryption key operable at the appropriate level to decrypt the encrypted target record in a reverse operation.

8. The computer-implemented system of claim 7, further comprising means for analyzing the number, location, length, or sequence of one or more characters, words, spaces, and punctuation marks.

9. The computer-implemented system of claim 7, further comprising means for creating the linguistic encryption key based on the analysis of one or more clear text linguistic attributes including the number, location, length, or sequence of one or more characters, words, spaces, and punctuation marks.

10. The computer-implemented system of claim 7, further comprising means for encrypting the target record with the linguistic encryption key as one level of at least four levels of encryption.

11. The computer-implemented system of claim 7, wherein the linguistic encryption key comprises a sequence of values for one or more linguistic attributes selected for analysis, and one or more separators to separate the values.

12. The computer-implemented system of claim 7, wherein the clear text is represented by one or more character sets in a standard international text coding system, and the linguistic encryption key is generated from one or more languages capable of being represented by the one or more character sets in the standard international text coding system.

13. A non-volatile computer-readable medium storing computer code that when executed on a computing device adapts the device to perform encryption and decryption of a record, the computer-readable medium comprising:
   code for identifying a target record to be encrypted;
   code for analyzing one or more clear text linguistic attributes of the target record;
   code for generating a linguistic encryption key based on the analysis of one or more clear text linguistic attributes; and
   code for encrypting the target record with the linguistic encryption key at one level of multiple levels of encryption keys, the linguistic encryption key operable at the appropriate level to decrypt the encrypted target record in a reverse operation.

14. The non-volatile computer-readable medium of claim 13, further comprising code for analyzing the number, location, length, or sequence of one or more characters, words, spaces, and punctuation marks.

15. The non-volatile computer-readable medium of claim 13, further comprising code for creating the linguistic encryption key based on the analysis of one or more clear text linguistic attributes including the number, location, length, or sequence of one or more characters, words, spaces, and punctuation marks.

16. The non-volatile computer-readable medium of claim 13, further comprising code for encrypting the target record with the linguistic encryption key as one level of at least four levels of encryption.

17. The non-volatile computer-readable medium of claim 13, wherein the linguistic encryption key comprises a sequence of values for one or more linguistic attributes selected for analysis, and one or more separators to separate the values.

* * * * *